(12) United States Patent
Kanzaki

(10) Patent No.: US 11,162,601 B2
(45) Date of Patent: Nov. 2, 2021

(54) VALVE DEVICE

(71) Applicant: DENSO CORPORATION, Kariya (JP)

(72) Inventor: Shogo Kanzaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/083,524

(22) Filed: Oct. 29, 2020

(65) Prior Publication Data

US 2021/0140554 A1    May 13, 2021

(30) Foreign Application Priority Data

Nov. 7, 2019  (JP) .............................. JP2019-202523

(51) Int. Cl.
*F16K 27/04* (2006.01)
*F16K 11/076* (2006.01)
*F16K 41/06* (2006.01)

(52) U.S. Cl.
CPC .......... *F16K 27/041* (2013.01); *F16K 11/076* (2013.01); *F16K 41/066* (2013.01); *Y10T 137/86863* (2015.04)

(58) Field of Classification Search
CPC .... F16K 27/041; F16K 11/076; F16K 41/066; Y10T 137/86863
See application file for complete search history.

(56) References Cited

U.S. PATENT DOCUMENTS

| 2014/0069522 A1* | 3/2014 | Kuze ........................ F01P 7/14 137/334 |
| 2015/0027572 A1* | 1/2015 | Morein ................. F16K 41/026 137/625.19 |
| 2016/0010536 A1* | 1/2016 | Murakami .......... F16K 11/0876 137/625.44 |
| 2016/0096414 A1* | 4/2016 | Michikawauchi ....... F01P 11/16 165/267 |

(Continued)

FOREIGN PATENT DOCUMENTS

| FR | 3 015 561 | 6/2015 |
| FR | 3 015 612 | 6/2015 |

(Continued)

OTHER PUBLICATIONS

U.S. Appl. No. 17/083,540, to Nomura, entitled "Valve Device", filed Oct. 29, 2020 (84 pages).

(Continued)

*Primary Examiner* — Kevin R Barss
(74) *Attorney, Agent, or Firm* — Nixon & Vanderhye P.C.

(57) ABSTRACT

A valve device includes a housing, a valve, a partition wall, and a seal member. The partition wall is fit into the housing. The housing includes a first cylindrical inner wall, a second cylindrical inner wall, and a third inner wall. The second cylindrical inner wall is tapered from the third inner wall to the first cylindrical inner wall and the third inner wall defines a housing through hole. The partition wall defines a partition wall through hole that extends in the radial direction and that overlaps with both the first cylindrical inner wall and the (Continued)

second cylindrical inner wall in the radial direction. An annular space that is in communication with both the partition wall through hole and the housing through hole is defined between the second cylindrical inner wall and the outer wall of the partition wall.

2 Claims, 7 Drawing Sheets

(56) References Cited

U.S. PATENT DOCUMENTS

| | | | |
|---|---|---|---|
| 2016/0376977 A1* | 12/2016 | Watanabe | F01P 7/167 123/41.08 |
| 2019/0003370 A1 | 1/2019 | Nomura et al. | |
| 2019/0219179 A1 | 7/2019 | Sato | |
| 2020/0109787 A1 | 4/2020 | Tsuji | |
| 2020/0109788 A1 | 4/2020 | Ikemoto | |
| 2020/0114725 A1 | 4/2020 | Kanzaki | |
| 2020/0149462 A1 | 5/2020 | Kanzaki | |

FOREIGN PATENT DOCUMENTS

| | | |
|---|---|---|
| WO | 2018/230661 | 12/2018 |
| WO | 2019/230752 | 12/2019 |
| WO | 2019/230793 | 12/2019 |
| WO | 2019/230796 | 12/2019 |

OTHER PUBLICATIONS

U.S. Appl. No. 17/083,422, to Kanzaki, entitled "Valve Device", filed Oct. 29, 2020 (34 pages).
U.S. Appl. No. 17/083,422, filed Oct. 29, 2020, Valve Device.
U.S. Appl. No. 17/083,524, filed Oct. 29, 2020, Valve Device.
U.S. Appl. No. 17/083,540, filed Oct. 29, 2020, Valve Device.

* cited by examiner

VALVE DEVICE

CROSS REFERENCE TO RELATED APPLICATION

This application is based on Japanese Patent Application No. 2019-202523 filed on Nov. 7, 2019, the disclosure of which is incorporated herein by reference in its entirety.

TECHNICAL FIELD

The present disclosure relates to a valve device configured to adjust a flow rate of a liquid.

BACKGROUND

A valve device adjusts a flow rate of a liquid. The valve device includes a housing and a valve. The housing defines an inner space, an inflow opening, and an outflow opening. The valve is housed in the inner space. The liquid flows into the inner space through the inflow opening and flows out of the inner space through the outflow opening. The valve has a valve body configured to adjust a flow rate of the liquid flowing out through the outflow opening and a rotational shaft configured to rotate the valve body. The valve device includes a first end side and a second end side in an axial direction of the rotational shaft.

SUMMARY

A valve device is configured to adjust a flow rate of a liquid. The valve device includes a housing, a valve, a partition wall, and a seal member. The housing defines an inner space, an inflow opening, and an outflow opening. The fluid flows into the inner space through the inflow opening and flows out of the inner space through the outflow opening. The valve is disposed in the inner space. The valve includes a valve body configured to adjust the flow rate of the liquid flowing out of the inner space through the outflow opening and a rotational shaft configured to rotate the valve body. A first end side and a second end side for the valve device is defined in an axial direction of the rotational shaft. The partition wall is formed as a separate component from the housing and located in the first end side of the housing to separate the inner space from an outer space of the housing. The partition wall rotatably supports the rotational shaft. The seal member is configured to seal a space between the partition wall and the housing. The housing includes a first cylindrical inner wall, a second cylindrical inner wall, and a third inner wall. The first cylindrical inner wall, the second cylindrical inner wall, and the third inner wall are arranged and connected to each other in this order from the second end side to the first end side of the housing. The first cylindrical inner wall is in contact with the seal member when the partition wall is attached to the housing. The second cylindrical inner wall is tapered relative to an axis of the rotational shaft such that a distance between the second cylindrical inner wall and the axis of the rotational shaft in a direction perpendicular to the axial direction gradually decreases in a direction from the first end side to the second end side of the second cylindrical inner wall. The third inner wall defines a housing through hole passing through the housing. The partition wall is located radially inward of both the first cylindrical inner wall and the second cylindrical inner wall and includes an engaging portion engaging with the housing. The seal member is attached to the engaging portion to entirely surround an outer wall of the engaging portion in a circumferential direction of the engaging portion. The seal member is pressed between the outer wall of the engaging portion and the first cylindrical inner wall. The engaging portion defines an insertion hole into which the rotational shaft is inserted and a partition wall through hole that passes through the engaging portion in the direction perpendicular to the axial direction and that extends from the insertion hole. The partition wall through hole is located on the first end side of the seal member in the axial direction and overlaps with both the first cylindrical inner wall and the second cylindrical inner wall in the direction perpendicular to the axial direction. An annular space that is in communication both with the partition through hole and the housing through hole is defined between the second cylindrical inner wall and the outer wall of the engaging portion.

DETAILED DESCRIPTION

Figure 1:
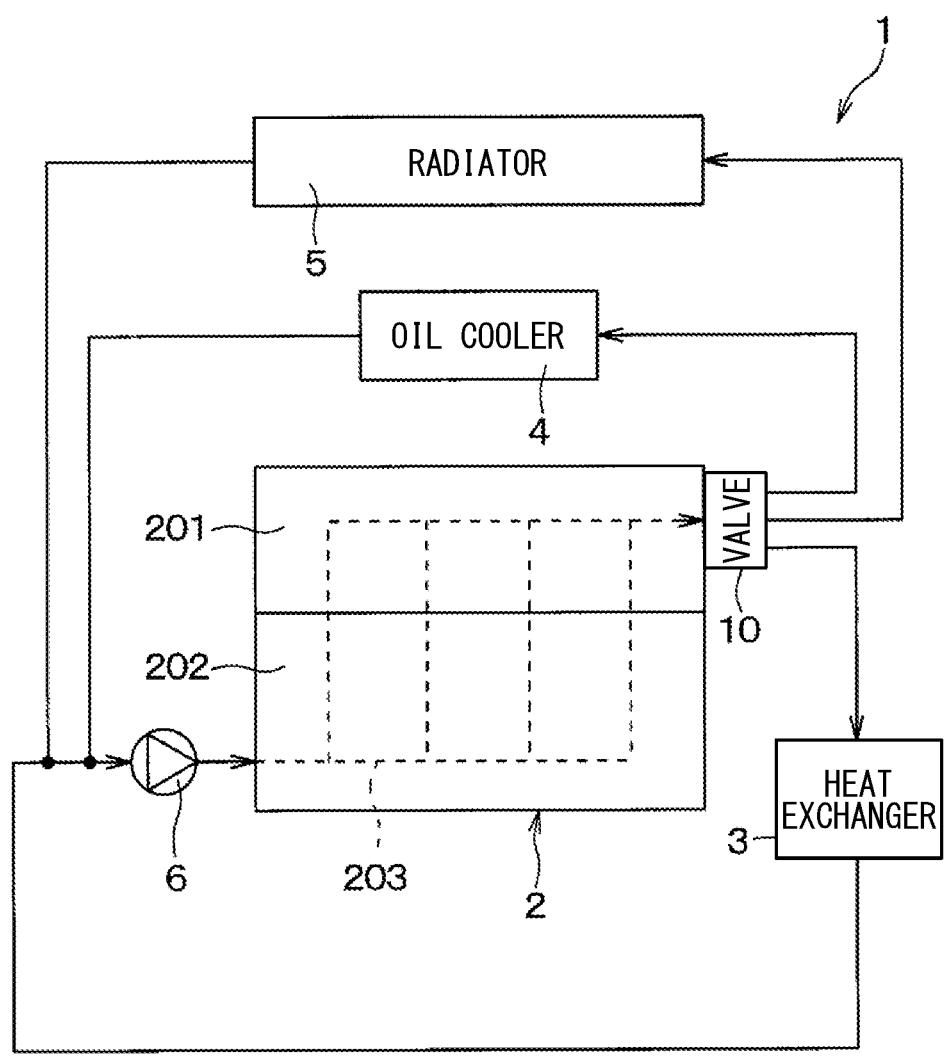
FIG. 1 is a schematic diagram of a cooling system for which a valve device in a first embodiment is applied.

To begin with, examples of relevant techniques will be described.

A valve device adjusts a flow rate of a liquid. The valve device includes a housing and a valve. The housing defines an inner space, an inflow opening, and an outflow opening. The valve is housed in the inner space. The liquid flows into the inner space through the inflow opening and flows out of the inner space through the outflow opening. The valve has a valve body configured to adjust a flow rate of the liquid flowing out through the outflow opening and a rotational shaft configured to rotate the valve body. The valve device includes a first end side and a second end side in an axial direction of the rotational shaft.

The valve device further includes a partition wall and a sealing member. The partition wall is fit into the housing on the first end side of the housing in the axial direction. The sealing member is configured to seal a space between the partition wall and the housing. The partition wall is made as a separate component from the housing. The partition wall supports the rotational shaft and separates the inner space of the housing from an outer space of the housing. The partition wall includes an engaging portion engaging with the housing when the partition wall is disposed inside the housing. The sealing member is attached to the engaging portion to entirely surround an outer wall of the engaging portion in a circumferential direction of the engaging portion. The sealing member is pressed between the outer wall of the engaging portion and an inner wall of the housing.

The engaging portion defines an insertion hole into which the rotational shaft is inserted and a partition wall through hole that passes through the engaging portion in a perpendicular direction to the axial direction and that extends from the insertion hole. The partition wall through hole is located on the first end side of the sealing member in the axial direction. The housing defines a housing through hole on the first end side of the partition wall through hole in the axial direction. An annular space that is in communication with both the partition wall through hole and the housing through hole is defined between the engaging portion and the housing.

According to this, when a fluid leaks from the inner space of the housing into the insertion hole of the engaging portion, the fluid having leaked from the inner space can flow out of the housing through the partition wall through hole, the annular space, and the housing through hole. Thus, the fluid is restricted from flowing into the first side of the partition wall in the axial direction.

In the valve device described above, in order to define the annular space, a portion of the inner wall of the housing located in a same position in the axial direction with the partition wall through hole is distanced from the outer wall of the engaging portion. This is one of causes to increase a size of the valve device.

In the valve device described above, the inner wall of the housing have a stepped portion in order to distance the portion of the inner wall from the outer wall of the engaging portion. Thus, when the engaging portion with the sealing member is inserted into inside of the inner wall, the sealing member may caught in the stepped portion. As a result, the valve device has a poor assembling property between the housing and the partition wall.

In view of points described above, it is objective of the present disclosure to provide a valve device that can improve an assembly property between a housing and a partition wall and reduce a size of the valve device.

A valve device is configured to adjust a flow rate of a liquid. The valve device includes a housing, a valve, a partition wall, and a seal member. The housing defines an inner space, an inflow opening, and an outflow opening. The fluid flows into the inner space through the inflow opening and flows out of the inner space through the outflow opening. The valve is disposed in the inner space. The valve includes a valve body configured to adjust the flow rate of the liquid flowing out of the inner space through the outflow opening and a rotational shaft configured to rotate the valve body. A first end side and a second end side for the valve device is defined in an axial direction of the rotational shaft. The partition wall is formed as a separate component from the housing and located in the first end side of the housing to separate the inner space from an outer space of the housing. The partition wall rotatably supports the rotational shaft. The seal member is configured to seal a space between the partition wall and the housing. The housing includes a first cylindrical inner wall, a second cylindrical inner wall, and a third inner wall. The first cylindrical inner wall, the second cylindrical inner wall, and the third inner wall are arranged and connected to each other in this order from the second end side to the first end side of the housing. The first cylindrical inner wall is in contact with the seal member when the partition wall is attached to the housing. The second cylindrical inner wall is tapered relative to an axis of the rotational shaft such that a distance between the second cylindrical inner wall and the axis of the rotational shaft in a direction perpendicular to the axial direction gradually decreases in a direction from the first end side to the second end side of the second cylindrical inner wall. The third inner wall defines a housing through hole passing through the housing. The partition wall is located radially inward of both the first cylindrical inner wall and the second cylindrical inner wall and includes an engaging portion engaging with the housing. The seal member is attached to the engaging portion to entirely surround an outer wall of the engaging portion in a circumferential direction of the engaging portion. The seal member is pressed between the outer wall of the engaging portion and the first cylindrical inner wall. The engaging portion defines an insertion hole into which the rotational shaft is inserted and a partition wall through hole that passes through the engaging portion in the direction perpendicular to the axial direction and that extends from the insertion hole. The partition wall through hole is located on the first end side of the seal member in the axial direction and overlaps with both the first cylindrical inner wall and the second cylindrical inner wall in the direction perpendicular to the axial direction. An annular space that is in communication both with the partition through hole and the housing through hole is defined between the second cylindrical inner wall and the outer wall of the engaging portion.

The second cylindrical inner wall of the housing is tapered such that a distance between the second cylindrical inner wall and the axis of the rotational shaft in the direction perpendicular to the axial direction gradually decreases from the first end side to the second end side of the second cylindrical inner wall. The second cylindrical inner wall is continuously connected to the first end side of the first cylindrical inner wall without defining a step between the second cylindrical inner wall and the first cylindrical inner wall.

Thus, when the engaging portion with the seal member is inserted into the first cylindrical inner wall and the second cylindrical inner wall in the axial direction from the first end side of the housing, the seal member is not caught in the step. Thus, the valve device has a good assembling property between the housing and the partition wall.

The partition wall through hole overlaps with both the first cylindrical inner wall and the second cylindrical inner wall in the direction perpendicular to the axial direction (i.e., an extending direction of the partition wall through hole). The annular space that is in communication with both the partition wall through hole and the housing through hole is defined between the second cylindrical inner wall and the outer wall of the engaging portion.

Thus, it is not necessary to place a portion of the inner wall of the housing located in the same position with the partition wall through hole in the axial direction to have a distance from the outer wall of the engaging portion in order to define the annular space. That is, the portion located in the same position with the partition wall through hole in the axial direction can be placed closer to the outer wall of the engaging portion. When a distance between the first cylindrical inner wall and the axis is the same and a thickness of the housing at a position overlapping with the partition wall through hole in the axial direction is the same, the valve device of the present disclosure can reduce a distance between the outer wall of the housing and the axis located in a same position with the partition wall through hole. That is, an external dimension of the valve device can be reduced.

As described above, the valve device of the present disclosure can improve the assembling property between the housing and the partition wall and be reduced in size.

Hereinafter, embodiments of the present disclosure will be described with reference to the drawings. In the respective embodiments described herein, identical or equivalent parts are given identical reference numbers.

First Embodiment

A first embodiment will be described with reference to FIGS. 1 through 6. A valve device 10 is applied for, for example, a cooling system 1 circulating a cooling water for cooling an internal combustion engine 2 of a vehicle. The valve device 10 is configured to adjust a flow rate of the cooling water circulating through the cooling system 1. The cooling water in this specification is a cooling liquid containing ethylene glycol as a main component. The cooling water may be other liquid.

As shown in FIG. 1, the cooling system 1 includes the valve device 10, the internal combustion engine 2, an air-conditioning heat exchanger 3, an oil cooler 4, a radiator 5, and a water pump 6.

The internal combustion engine 2 includes a cylinder head 201 housing a spark plug and the like, a cylinder block housing a cylinder and the like, and a water jacket 203 that is a passage for the cooling water. The cooling water flowing through the water jacket 203 is heated by absorbing a heat generated when the cylinder and the like is operated. The valve device 10 is connected to an outlet of the water jacket 203.

The valve device 10 is located in the cylinder head 201 at which the outlet of the water jacket 203 is defined. The cooling water heated by flowing through the water jacket 203 flows into the valve device 10. The valve device 10 is configured to flow a required amount of the cooling water flowing into the valve device 10 respectively for the air-conditioning heat exchanger 3, the oil cooler 4, and the radiator 5.

The air-conditioning heat exchanger 3 radiates heat of the cooling water by exchanging heat between the cooling water flowing out of the valve device 10 and an air conveyed into a vehicle cabin. The water pump 6 is connected to a position downstream of the air-conditioning heat exchanger 3. The cooling water having flown out of the air-conditioning heat exchanger 3 flows into the water pump 6.

The oil cooler 4 cools an oil by exchanging heat between the cooling water flowing out of the valve device 10 and the oil. The water pump 6 is connected to a position downstream of the oil cooler 4. The cooling water having flown out of the oil cooler 4 flows into the water pump 6.

The radiator 5 radiates heat of the cooling water by exchanging heat between the cooling water flowing out of the valve device 10 and an outside air. The water pump 6 is connected to a position downstream of the radiator 5. The cooling water having flown out of the radiator 5 flows into the water pump 6.

The air-conditioning heat exchanger 3, the oil cooler 4, and the radiator 5 are connected to positions upstream of the water pump 6. An inlet of the water jacket 203 is connected to a position downstream of the water pump 6. The water pump 6 causes the cooling water flowing into the water pump 6 from the air-conditioning heat exchanger 3, the oil cooler 4, and the radiator 5 to flow into the water jacket 203.

Accordingly, in the cooling system 1, the water pump 6 circulates the cooling water and the valve device 10 allows a required amount of the cooling water to flow respectively to devices.

Figure 2:
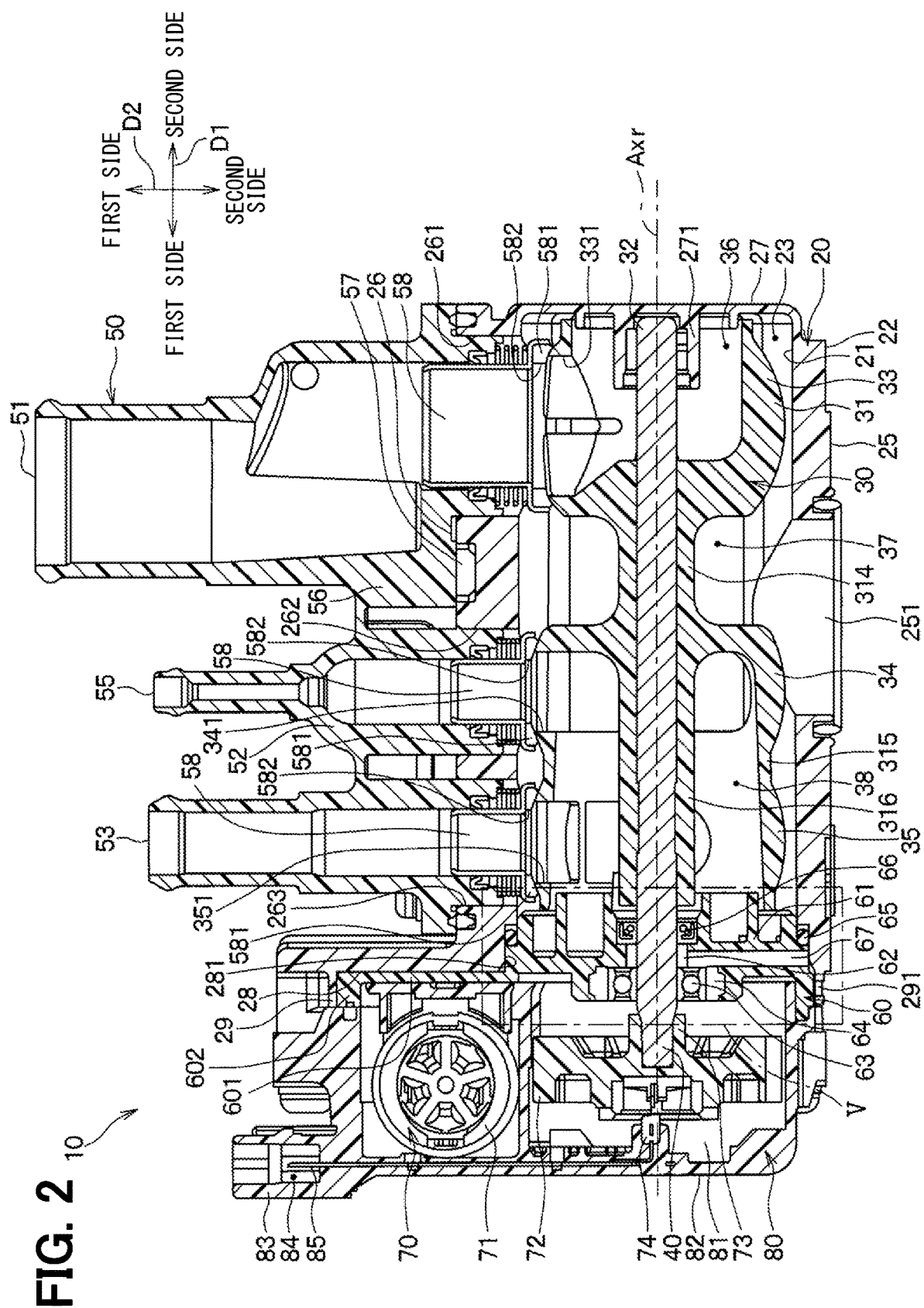
FIG. 2 is a schematic cross-sectional view of the valve device in the first embodiment.
Figure 3:
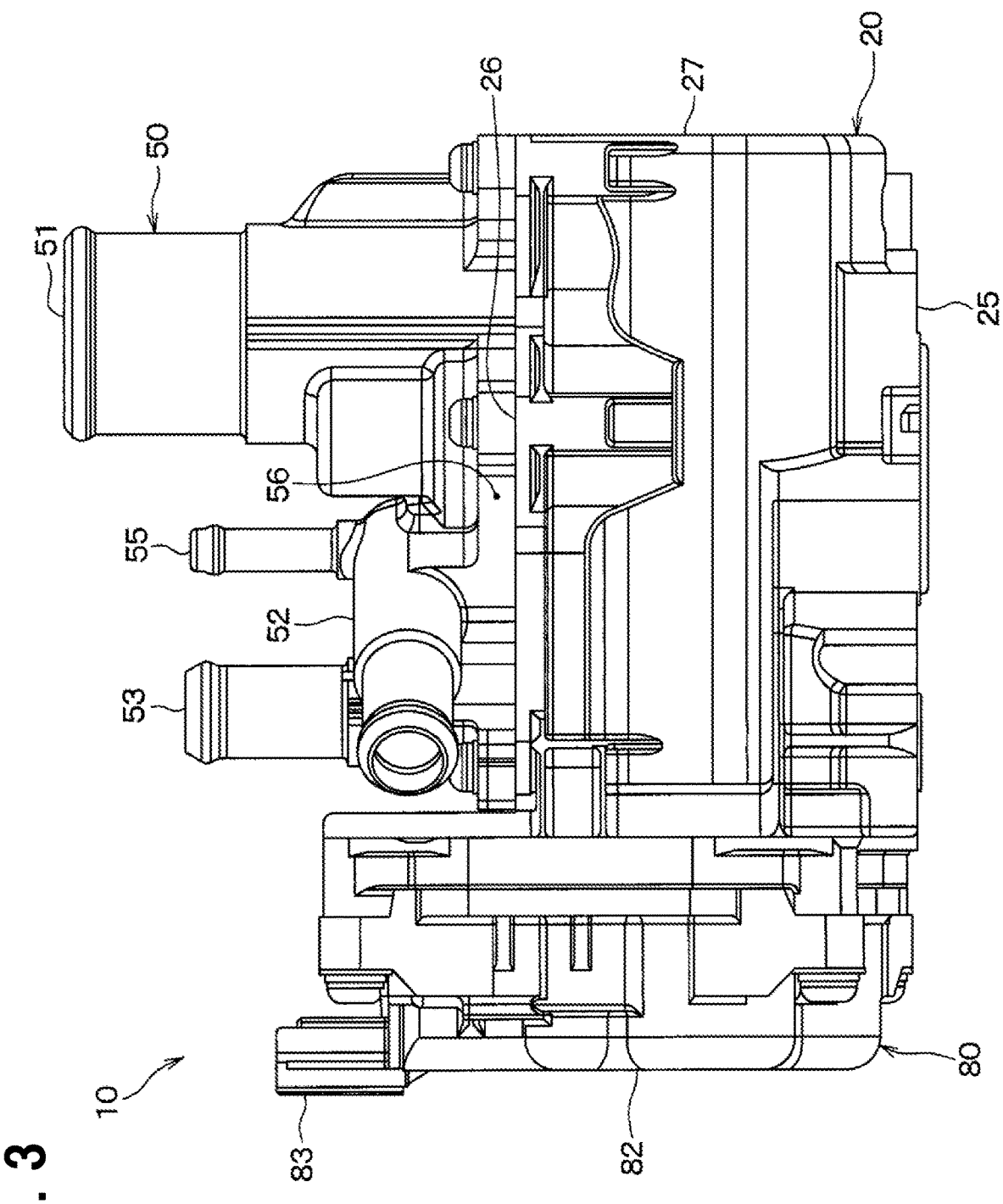
FIG. 3 is a schematic cross-sectional view of the valve device in the first embodiment.
Figure 4:
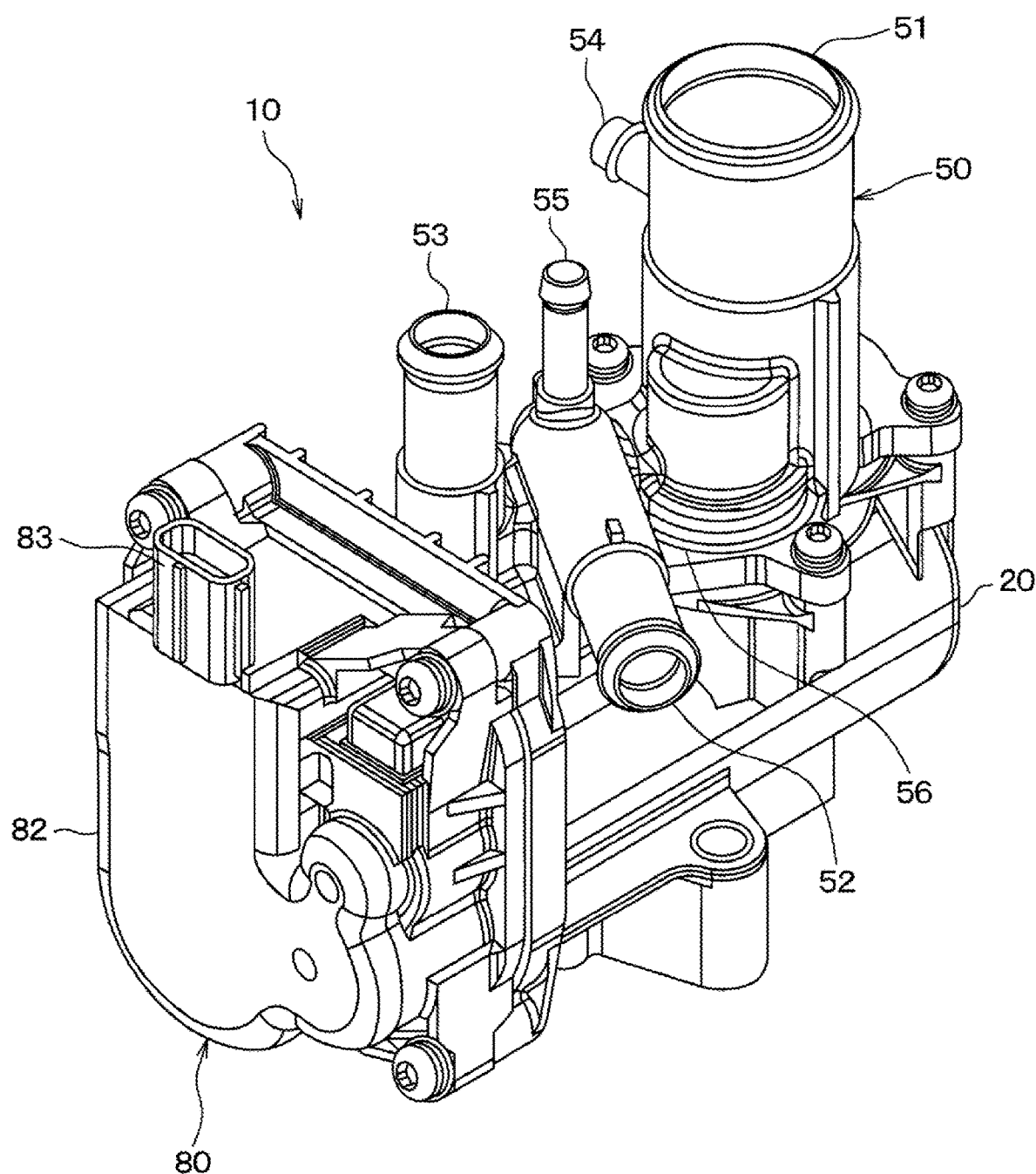
FIG. 4 is a schematic perspective view of the valve device in the first embodiment.

Next, the valve device 10 will be described. As shown in FIG. 2, the valve device 10 includes a housing 20, a valve 30, a pipe member 50, a partition wall 60, a driving unit 70, and a driving unit cover 80. An axial direction D1 in FIG. 2 is an axial direction of a shaft 32 which will be described later. The axial direction D1 of the shaft 32 is a direction parallel to an axis Axr of the shaft 32. A first end side and a second end side for the valve device 10 is defined in the axial direction D1. An axial perpendicular direction D2 in FIG. 2 is a direction perpendicular to the axial direction D1 of the shaft 32. A first end side and a second end side for the valve device 10 is also defined in the axial perpendicular direction D2. The housing 20, the pipe member 50, and the driving unit cover 80 in FIG. 2 are also shown in FIGS. 3 and 4.

The housing 20 is formed into a bottomed cylindrical shape and made of a resin. The housing 20 houses the valve 30. The housing 20 defines an inner space 23 therein. The housing 20 includes a housing inner wall 21 defining the inner space 23 of the housing 20 and a housing outer wall 22 forming an outer frame of the housing 20.

The housing inner wall 21 is formed into a cylindrical hollow shape such that the inner space 23 is formed into a circular pillar shape. The valve 30 is disposed in the inner space 23.

The housing outer wall 22 includes an engine attachment surface 25 to which an internal combustion engine 2 is attached, a pipe attachment surface 26 to which the pipe member 50 is attached, a housing bottom surface 27 forming a bottom surface of the housing 20, and a housing opening surface 28 to which the partition wall 60 is attached. The engine attachment surface 25 and the pipe attachment surface 26 face each other. In other words, the pipe attachment surface 26 is located in a side of the housing 20 opposite to the engine attachment surface 25. The engine attachment surface 25 and the pipe attachment surface 26 are substantially parallel to each other. The housing bottom surface 27 and the housing opening surface 28 face each other. The housing bottom surface 27 and the housing opening surface 28 are substantially parallel to each other.

The engine attachment surface 25 has a substantially flat shape and the internal combustion engine 2 is attachable to the engine attachment surface 25. The engine attachment surface 25 defines an inlet port 251 through which a cooling water flows into the inner space 23. The inlet port 251 opens in a circular shape and the water jacket 203 is connected to the inlet port 251. The inlet port 251 corresponds to an inflow opening through which the cooling water flows into the inner space 23 of the housing 20.

The pipe attachment surface 26 has a substantially flat shape and the pipe member 50 which will be described later is attachable to the pipe attachment surface 26. The pipe attachment surface 26 defines a first outlet port 261, a second outlet port 262, and a third outlet port 263. The cooling water flowing into the inner space 23 via the inlet port 251 flows out of the inner space 23 to the pipe member 50 through the first outlet port 261, the second outlet port 263, and the third outlet port 263. Each of the first outlet port 261, the second outlet port 262, and the third outlet port 263 opens in a circular shape. The first outlet port 261, the second outlet port 262, and the third outlet port 263 are located separately in different positions in the axial direction D1 in the pipe attachment surface 26. Each of the first outlet port 261, the second outlet port 262, and the third outlet port 263 corresponds to an outflow opening through which the cooling water flows out of the inner space 23 of the housing 20.

The housing bottom surface 27 has a substantially flat shape and continuously connected to the engine attachment surface 25 and the pipe attachment surface 26. The housing inner wall 21 of the housing bottom surface 27 includes a shaft supporter 271 configured to rotatably support the shaft 32. The shaft supporter 271 will be described later rotatable.

The housing opening surface 28 has a substantially flat shape and the partition wall 60 which will be described later is attachable to the housing opening surface 28. The housing opening surface 28 includes a housing opening portion 281 that fluidly connects the inner space 23 to an outer space of the housing 20. The housing opening portion 281 surrounds an opening in fluid communication with both the inner space 23 and the outer space of the housing 20. The housing opening portion 281 is closed by the partition wall 60 when the partition wall 60 is attached to the housing opening surface 28.

The pipe attachment surface 26 is located in the first end side of the housing 20 in the axial perpendicular direction, so that the pipe member 50 is attached to the first end side of the housing 20 in the axial perpendicular direction D2. In this embodiment, the internal combustion engine 2 is located on the second end side of the housing 20 in the axial perpendicular direction D2. Thus, the pipe member 50 is attached to a side of the housing 20 opposite to the internal combustion engine 2. The pipe member 50 allows the cooling water flowing into the inner space 23 to flow toward the air-conditioning heat exchanger 3, the oil cooler 4, and the radiator 5. The pipe member 50 may be made of a resin.

The pipe member 50 includes multiple pipes respectively in communication with the first outlet port 261, the second outlet port 262, and the third outlet port 263. Specifically, as shown in FIGS. 2, 3, and 4, the multiple pipes includes a first pipe 51, a second pipe 52, a third pipe 53, a fourth pipe 54, a fifth pipe 55, and a pipe connecting portion 56. The pipes 51, 52, 53, 54, and 55 are formed into cylindrical hollow shapes.

The pipe connecting portion 56 connects between the first pipe 51, the second pipe 52, and the third pipe 53 and attaches the pipe member 50 to the pipe attachment surface 26. The pipe connecting portion 56 is in contact with the pipe attachment surface 26 and can be fixed to the pipe attachment surface 26. As shown in FIG. 2, a gasket 57 is disposed between the pipe connecting portion 56 and the pipe attachment surface 26 to restrict the cooling water from leaking from the valve device 10.

An upstream end of the first pipe 51 in a flow of the cooling water is disposed in the first outlet port 261. A downstream end of the first pipe 51 in the flow of the cooling water is connected to the radiator 5 through a hose (not shown). An upstream end of the second pipe 52 in the flow of the cooling water is disposed in the second outlet port 262. A downstream end of the second pipe 52 in the flow of the cooling water is connected to the air-conditioning heat exchanger 3 through a hose (not shown). An upstream end of the third pipe 53 in the flow of the cooling water is disposed in the third outlet port 263. A downstream end of the third pipe 53 in the flow of the cooling water is connected to the oil cooler 4 through a hose (not shown).

As shown in FIG. 4, an upstream end of the fourth pipe 54 in the flow of the cooling water is connected to an upstream side of the first pipe 51. A downstream end of the fourth pipe 54 in the flow of the cooling water is connected to a reservoir tank through a hose which are not shown. As shown in FIG. 2, an upstream end of the fifth pipe 55 in the flow of the cooling water is connected to an upstream side of the second pipe 52 in the flow of the cooling water. A downstream end of the fifth pipe 55 in the flow of the cooling water is connected to a throttle through a hose which are not shown.

Seal units 58 are disposed respectively between the first pipe 51 and the first outlet port 261, between the second pipe 52 and the second outlet port 262, and between the third pipe 53 and the third outlet port 263. The seal units 58 restrict the cooling water from leaking from spaces between the first pipe 51 and the first outlet port 261, between the second pipe 52 and the second outlet port 262, and between the third pipe 53 and the third outlet port 263. Each of the seal units 58 includes a valve seal 581 to restrict the cooling water from leaking. The valve seal 581 is located in an upstream side of the seal unit 58 in the flow the cooling water.

The valve seal 581 is made of, for example, a resin into a substantially circular annular shape and defines a seal opening 582 therein. The cooling water can flow through the seal opening 582. The valve seal 581 is disposed such that an upstream surface in the flow of the cooling water is in contact with an outer circumferential wall of a valve body 31 which will be described later.

The partition wall 60 is a wall that separates the inner space 23 from an outer space of the housing 20. The partition wall 60 is a separate component from the housing 20. The partition wall 60 is disposed in the first end side of the inner space 23 in the axial direction D1. The partition wall 60 is in contact with and fixed to the housing opening surface 28. The partition wall 60 is made of, for example, a resin into a plate shape and covers the housing opening portion 281.

The partition wall 60 serves both as a member to support the shaft 32 and a member to house the driving unit 70. Thus, the partition wall 60 closes the housing opening portion 281 and supports the valve 30 which will be described later. In addition, the partition wall 60 defines a space with the driving unit cover 80 to house the driving unit 70.

Specifically, as shown in FIG. 2, the partition wall 60 includes a contacting portion 601 and an opening-closing portion 61. The contacting portion 601 is a plate member in contact with the housing opening surface 28. The opening-closing portion 61 is a portion overlapping with the opening of the housing opening portion 281 in the axial direction and closing the housing opening portion 281.

The opening-closing portion 61 defines a shaft insertion hole 62 into which the shaft 32 of the valve 30 is inserted. The shaft insertion hole 62 corresponds to an insertion hole into which a rotational shaft is inserted. The partition wall 60 includes a bearing 63 to hold the shaft 32 inserted into the shaft insertion hole 62.

The shaft insertion hole 62 has an axils along an axis of the housing inner wall 21. The shaft insertion hole 62 and the bearing 63 are coaxial with the axis Axr of the shaft 32 when the shaft 32 is inserted into the shaft insertion hole 62.

The bearing 63 may be a ball bearing and rotatably supports the shaft 32 inserted into the shaft insertion hole 62. A metal ring 64 is disposed in an outer circumferential portion of the bearing 63 to dispose the bearing 63. The metal ring 64 is made of, for example, metal and formed into a substantially circular annular shape.

The opening-closing portion 61 is located in the opening of the housing opening portion 281. The opening-closing portion 61 has a substantially disc shape and a plate thickness direction in the same direction as the axial direction D1. The opening-closing portion 61 is disposed such that an outer wall of the opening closing portion 61 overlaps with an inner surface of the housing opening portion 281 in the axial perpendicular direction D2. The inner surface of the housing opening portion 281 faces and defines the housing opening portion 281.

A housing seal member 65 having a substantially circular annular shape is disposed between the outer surface of the opening-closing portion 61 and the inner surface of the housing opening portion 281. The housing seal member 65 closes a space between the partition wall 60 and the housing 20. The housing seal member 65 closes a space between the outer surface of the opening-closing portion 61 and the inner surface of the housing opening portion 281.

When the partition wall 60 is attached to the housing 20, the housing seal member 65 is attached to the outer surface of the opening-closing portion 61. The housing seal member 65 has an outer diameter larger than an inner diameter of the housing opening portion 281 and the opening-closing portion 61 is inserted into the housing opening portion 281. As a result, the housing seal member 65 is disposed between the housing opening portion 281 and the opening-closing portion 61. Therefore, the housing seal member 65 is compressed inward in a radial direction of the housing opening portion 281.

The opening-closing portion 61 includes a shaft seal member 66 in an inner circumferential portion of the shaft insertion hole 62. The shaft seal member 66 is made of a resin into a substantially circular annular shape and restricts the cooling water flowing into the inner space 23 from flowing into the shaft insertion hole 62. The shaft seal member 66 has an inner diameter smaller than an outer diameter of the shaft 32. The shaft 32 is inserted into the shaft seal member 66 when the shaft seal member 66 is located in the inner circumferential portion of the shaft insertion hole 62.

The opening-closing portion 61 defines a partition wall through hole 67 passing through the opening-closing portion 61 in the axial perpendicular direction D2. The partition wall through hole 67 extends from the shaft insertion hole 62 in the axial perpendicular direction D2. The partition wall through hole 67 is located in the first end side of the housing seal member 65 in the axial direction D1. The housing 20 defines a housing through hole 291 passing through the housing 20 in the axial perpendicular direction D2. The partition wall through hole 67 is in fluid communication with the housing through hole 291, so that the cooling water flowing into the shaft insertion hole 62 can flow out of the housing 20 through the partition wall through hole 67 and the housing passing through hole 291.

The housing 20 includes a housing outer circumferential portion 29. The housing outer circumferential portion 29 is a wall protruding from an outer circumferential portion of the housing opening surface 28 in the axial direction D1. The housing outer circumferential portion 29 extends from the housing opening surface 28 toward the first end side of the valve device 10 in the axial direction D1. The housing outer circumferential portion 29 has a tubular hollow shape that defines an inner space. The housing outer circumferential portion 29 entirely surrounds the partition wall 60 that is in contact with the housing opening surface 28 in a circumferential direction of the partition wall 60. The housing outer circumferential portion 29 is connected to the driving unit cover 80. The housing outer circumferential portion 29 forms, together with the driving unit cover 80, an outer frame of a housing that houses the driving unit 70.

Figure 5:
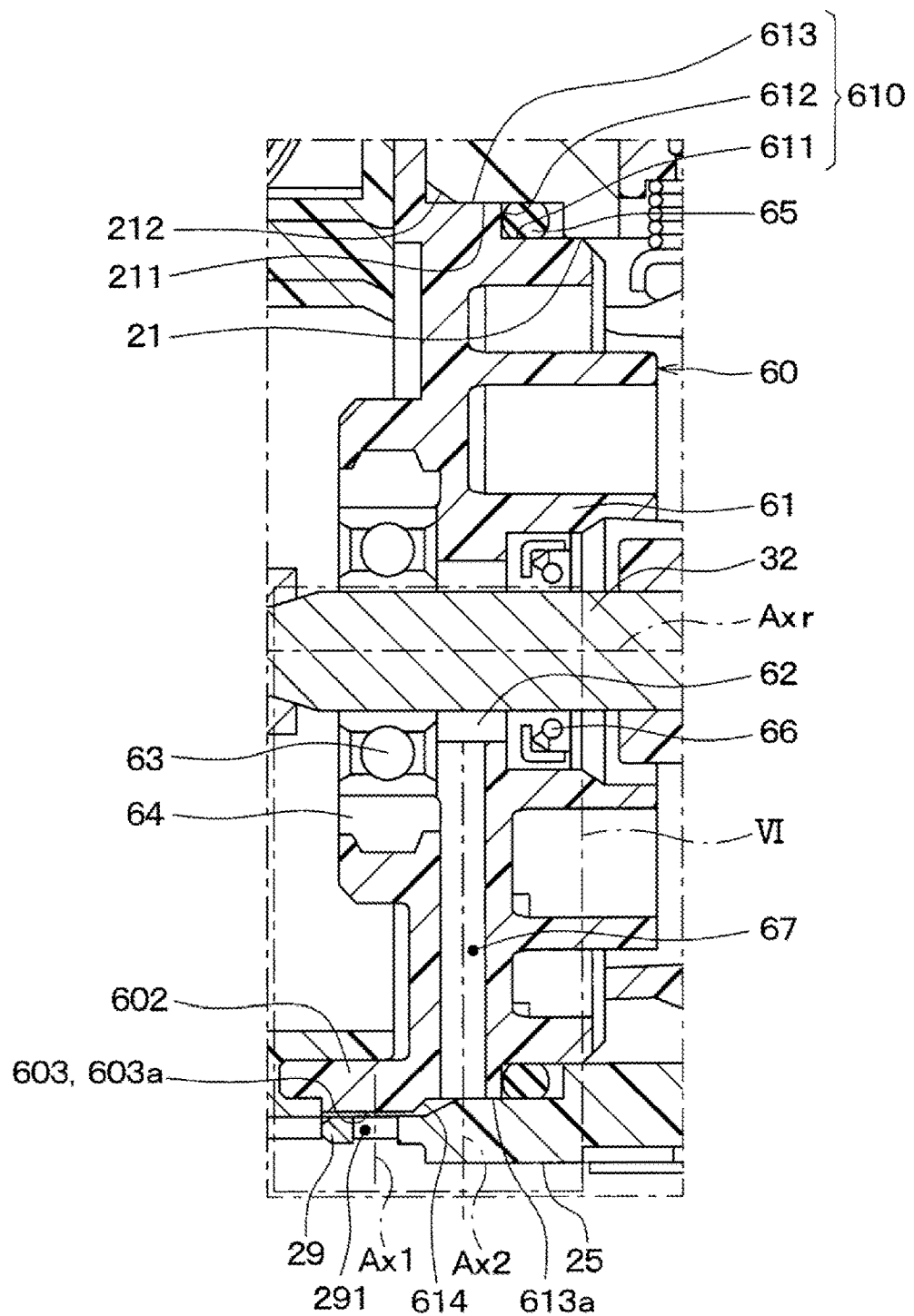
FIG. 5 is an enlarged view of a part V in FIG. 2.

As shown in FIG. 5, the housing outer circumferential portion 29 defines the housing through hole 291. The housing through hole 291 is located in the second end side in the axial perpendicular direction D2 of the housing outer circumferential portion 29 that is closer to the engine attachment surface 25. The housing through hole 291 is located in the first end side in the axial direction D1 of the partition wall through hole 67. That is, an axis Ax1 of the housing through hole 291 and an axis Ax2 of the partition wall through hole 67 are located in different positions in the axial direction D1. The entire opening area of the housing through hole 291 overlaps with the outer surface of the partition wall 60. Specifically, the partition wall 60 includes a partition wall outer circumferential portion 602 and the entire area of the housing through hole 291 entirely overlaps with an outer wall 603 of the partition wall outer circumferential portion 602 in the axial perpendicular direction D2.

As a result, even if water enters into the housing through hole 291 from the outside of the housing 20, the water is reflected at the outer wall 603 of the partition wall outer circumferential portion 602. Thus, the water is restricted from entering into the partition wall through hole 67 from the outside of the housing 20. For example, when the water having a high pressure flows into the housing through hole 291 in washing the vehicle, the water having a high pressure and having flown into the housing through hole 291 is reflected at the outer wall 603 of the partition wall outer circumferential portion 602. Thus, the water having a high pressure is restricted from entering into the partition wall through hole 67 from the outside of the housing 20.

Figure 6:
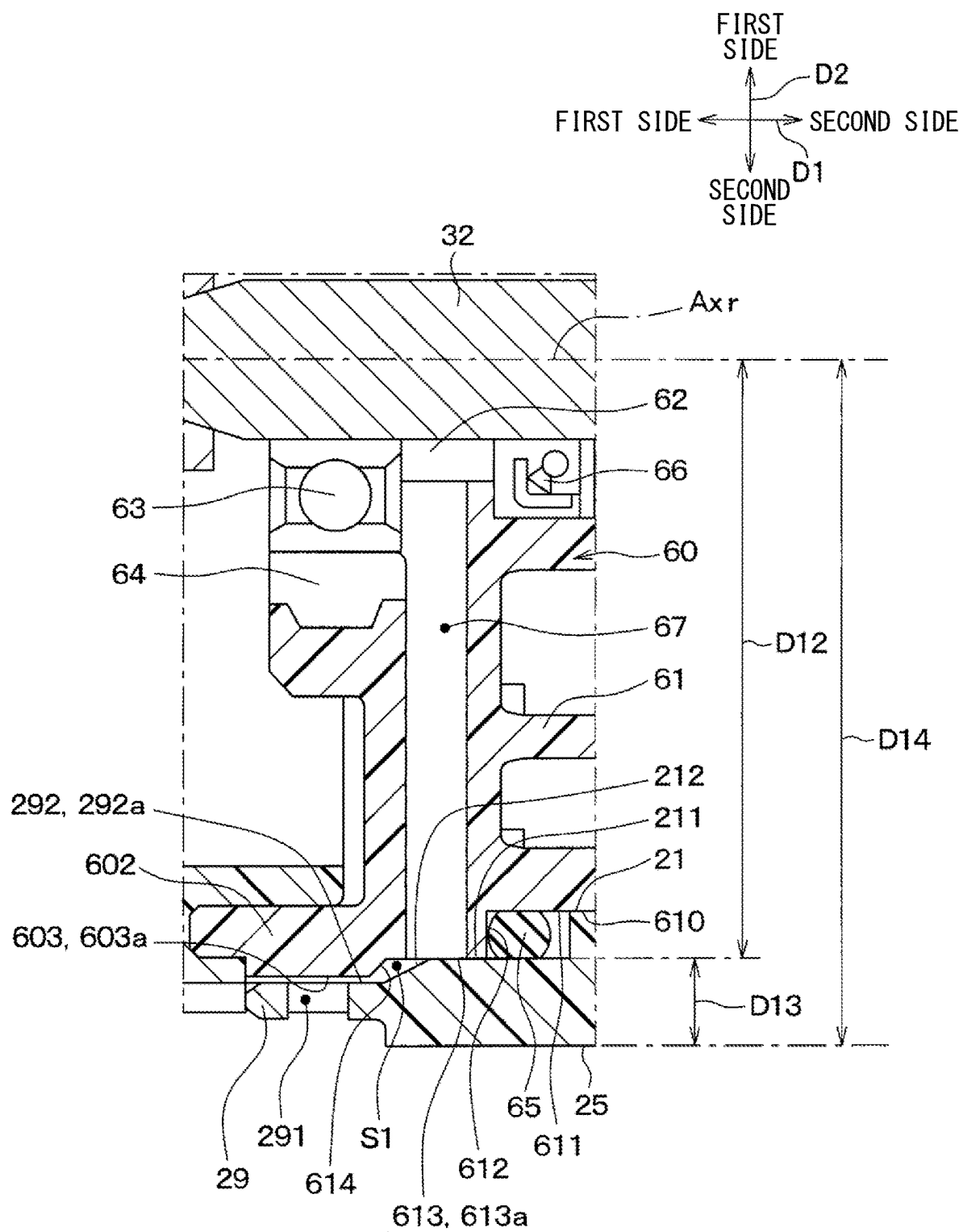
FIG. 6 is an enlarged view of a part VI in FIG. 5.

As shown in FIGS. 5 and 6, the opening-closing portion 61 includes a first outer wall 611, a second outer wall 612, and a third outer wall 613 in an outer wall 610 of the opening-closing portion 61. The first outer wall 611 is a surface to which the housing seal member 65 is attached. The first outer wall 611 is located inside of the housing seal member 65 and in contact with the housing seal member 65. The first outer wall 611 has a constant distance from the axis Axr in the axial perpendicular direction D2 in a cross section including the axis Axr.

The second outer wall 612 extends radially outward from the first end side of the first outer wall 611 in the axial perpendicular direction D2. The second outer wall 612 is a surface perpendicular to the axial direction D1.

The third outer wall 613 is located in the first end side of the first outer wall 611 in the axial direction D1. The third outer wall 613 is connected to an outer end of the second outer wall 612 in the radial direction of the shaft 32. The third outer wall 613 extends in the axial direction D1. That is, the third outer wall 613 has a constant distance from the axis Axr in the axial perpendicular direction D2 in the cross section including the axis Axr. When the distance between the third outer wall 613 and the axis Axr and the distance between the first outer wall 611 and the axis Axr are compared in the same cross section, the distance between the third outer wall 613 and the axis Axr is larger than the distance between the first outer wall 611 and the axis Axr. The third outer wall 613 defines the partition wall through hole 67 at a portion 613a on the second end side in the axial perpendicular direction D2 that is closer to the engine attachment surface 25.

As shown in FIGS. 2 and 5, the partition wall 60 includes the partition wall outer circumferential portion 602. The partition wall outer circumferential portion 602 is located in a first side end the partition wall 60 in the axial direction D1 and entirely extends in the circumferential direction. The partition wall outer circumferential portion 602 is connected to the driving unit cover 80. As shown in FIG. 2, the partition wall outer circumferential portion 602 is covered with the housing outer circumferential portion 29.

As shown in FIGS. 5 and 6, the partition wall 60 includes the outer wall 603 and a fourth outer wall 614. The outer wall 603 is an outer surface of the partition wall outer circumferential portion 602. The fourth outer wall 614 is connected to both the portion 613a of the third outer wall 613 facing the engine attachment surface 25 and a portion 603a of the outer wall 603 facing the engine attachment surface 25. The fourth outer wall 614 tapers such that a distance in the axial perpendicular direction D2 between the fourth outer wall 614 and the axis Axr gradually decreases from the first end side to the second end side in the axial direction D1 of the fourth outer wall 614. The housing through hole 291 overlaps with the portion 603a of the outer wall 603 of the partition wall outer circumferential portion 602 that faces the engine attachment surface 25 in the axial perpendicular direction D2.

As shown in FIGS. 5 and 6, the housing inner wall 21 includes a first cylindrical inner wall 211 and a second cylindrical inner wall 212 at a position overlapping with the opening-closing portion 61 in the axial perpendicular direction D2. The first cylindrical inner wall 211 and the second cylindrical inner wall 212 have cylindrical shapes. In other words, the opening-closing portion 61 is fit into the housing 20 such that the opening-closing portion 61 is disposed inside the first cylindrical inner wall 211 and the second cylindrical inner wall 212. Thus, the opening-closing portion 61 serves as an engaging portion engaging with the housing 20.

The first cylindrical inner wall 211 is located in the first end side of the housing 20 in the axial direction D1. The first cylindrical inner wall 211 extends in parallel in the axial direction D1. That is, the first cylindrical inner wall 211 defines a constant distance from the axis Axr in the axial perpendicular direction D2. The first cylindrical inner wall 211 is in contact with the housing seal member 65 when the partition wall 60 is attached to the housing 20. The housing seal member 65 is attached to the opening-closing portion 61 to entirely surround the outer wall of the opening-closing surface 61 in the circumferential direction. The housing seal member 65 is disposed between the opening-closing portion 61 and the first cylindrical inner wall 211.

The second cylindrical inner wall 212 is continuously connected to the first end side of the first cylindrical inner wall 211 in the axial direction D1. The second cylindrical inner wall 212 tapers such that a distance between the second cylindrical inner wall 212 and the axis Axr in the axial perpendicular direction D2 gradually decreases in a direction from the first end side to the second end side in the axial direction D1 in the cross section including the axis Axr.

As shown in FIG. 6, the housing outer circumferential portion 29 has an inner wall 292 and the inner wall 292 has a portion 292a facing the engine attachment portion 25. The portion 292a of the housing outer circumferential portion 29 is continuously connected to the first end side of the second cylindrical inner wall 212 in the axial direction D1. The portion 292a corresponds to a third inner wall of the housing 20. The portion 292a defines the housing through hole 291.

The partition wall through hole 67 extends from the shaft insertion hole 62 in the axial perpendicular direction D2. The partition wall through hole 67 overlaps with both the first cylindrical inner wall 211 and the second cylindrical inner wall 212 in the axial perpendicular direction D2. An annular space S1 that is in communication with the partition wall through hole 67 is defined between the second cylindrical inner wall 212 and the partition wall 60. The annular space S1 is formed into an annular shape. The annular space S1 is entirely continuous in the circumferential direction of the outer wall 610 of the opening closing portion 61. A portion of the annular space S1 closer to the engine attachment surface 25 is defined between the fourth outer wall 614 and the second cylindrical inner wall 212 in the axial direction D1. The annular space S1 is in communication with the housing through hole 291 through a space between the portion 603a of the outer wall 603 of the partition wall outer circumferential portion 602 located in the second end side in the axial perpendicular direction and the portion 292a of the inner wall 292 of the housing outer circumferential portion 29 located in the second end side in the axial perpendicular direction.

Next, the valve 30 will be described. As shown in FIG. 2, the valve 30 is a so-called ball valve and includes the valve body 31 made of a resin and the shaft 32 made of metal. The valve body 31 controls an amount of the cooling water flowing out of the valve 30. In other words, the valve body 31 adjusts the amount of the cooling water flowing out through the first outlet port 261, the second outlet port 262, and the third outlet port 263. The valve body 31 is connected to, for example, the shaft 32 and configured to rotate together with the shaft 32 around the axis Axr of the shaft 32.

The shaft 32 is a rotational shaft configured to rotate the valve body 31. The shaft 32 has a cylindrical pillar shape and a cross sectional shape in the axial perpendicular direction D2 that is a substantially true circle. The shaft 32 has a first end in the axial direction D1 connected to a gear unit 72 which will be described later. The shaft 32 has a second end in the axial direction D1 connected to the shaft supporter 271. The first end of the shaft 32 is disposed in the first end side of the valve device 10 and the second end of the shaft 32 is disposed in the second end side of the valve device 10.

The valve body 31 extends along the axis Axr of the shaft 32. The valve body 31 includes a first ball valve 33, a second ball valve 34, a third ball valve 35, a tubular connecting portion 314, a tubular valve connecting portion 315, and a shaft connecting portion 316. The first ball valve 33 and the second ball valve 34 are connected to each other through the tubular connecting portion 314. The second ball valve 34 and the third ball valve 35 are connected to each other through the tubular valve connecting portion 315. The tubular connecting portion 314 and the tubular valve connecting portion 315 have tubular shapes.

The shaft connecting portion 316 is located in a center of the first ball valve 33 to the third ball valve 35. The valve body 31 is connected to the shaft 32 through the shaft connecting portion 316. For example, the valve body 31 is integrally formed with the first ball valve 33, the second ball valve 34, the third ball valve 35, the tubular connecting portion 314, the tubular valve connecting portion 315, and the shaft connecting portion 316 by injection molding.

Each of the first ball valve 33, the second ball valve 34, and the third ball valve 35 has a tubular shape and is coaxial with the axis Axr of the shaft 32. The first ball valve 33, the second ball valve 34, and the third ball valve 35 are arranged along the shaft 32. Each of the first ball valve 33, the second ball valve 34, and the third ball valve 35 is formed such that a central portion in the axial direction D1 expands radially outward compared to both sides in the axial direction D1. Each of the first ball valve 33, the second ball valve 34, and the third ball valve 35 opens at the both sides in the axial direction D1 and defines a passage 36 therein through which the cooling water flows.

A first inter-valve space 37 is defined between the first ball valve 33 and the second ball valve 34 in the axial direction D1. The first inter-valve space 37 is defined between an outer circumferential portion of the tubular connecting portion 314 and the housing inner wall 21. That is, the passage 36 defined in the first ball valve 33 is fluidly connected to the passage 36 defined in the second ball valve 34 through the first inter-valve space 37.

The second ball valve 34 and the third ball valve 35 are connected to each other. Specifically, outer circumferential portions of the second ball valve 34 and the third ball valve 35 are connected to each other through an outer circumferential portion of the tubular valve connecting portion 315. Inner circumferential portions of the second ball valve 34 and the third ball valve 35 are connected to each other through an inner circumferential portion of the tubular valve connecting portion 315. That is, the passage 36 defined in the second ball valve 34 is fluidly connected to the passage 36 defined in the third ball valve 35 through a second inter-valve space 38 defined inside the tubular valve connecting portion 315.

Each of the first ball valve 33, the second ball valve 34, and the third ball valve 35 defines an opening at the outer circumferential portion. The opening fluidly connects the passage 36 to an outside of the first ball valve 33, the second ball valve 34, or the third ball valve 35. Specifically, the first ball valve 33 defines a first valve body opening 331 at the outer circumferential portion of the first ball valve 33. The second ball valve 34 defines a second valve body opening 341 at the outer circumferential portion of the second ball valve 34. The third ball valve 35 defines a third valve body opening 351 at the outer circumferential portion of the third ball valve 35.

The first ball valve 33 is disposed such that the first valve body opening 331 is fluidly in communication with both the first outlet port 261 and the seal opening 582 of the valve seal 581 disposed in the first outlet port 261. The second ball valve 34 is disposed such that the second valve body opening 341 is fluidly in communication with both the second outlet port 262 and the seal opening 582 of the valve seal 581 disposed in the second outlet port 262. The third ball valve 35 is disposed such that the third valve body opening 351 is fluidly in communication with both the third outlet port 263 and the seal opening 582 of the valve seal 581 disposed in the third outlet port 263. The tubular connecting portion 314 overlaps with the inlet port 251.

That is, the valve 30 is configured to allow the cooling water flowing out of the internal combustion engine 2 to flow into the inner space 23 through the inlet port 251 and then to flow into the passage 36 defined in the first ball valve 33, the second ball valve 34, and the third ball valve 35 through the first inter-valve space 37. In addition, the valve 30 is configured to allow the cooling water to flow out of the seal openings 582 of the valve seals 581 disposed in the first outlet port 261, the second outlet port 262, and the third outlet port 263 of the first valve body opening 331, the second valve body opening 341, and the third valve body opening 351 by rotating the valve body 31.

The valve 30 is configured to control an amount of the cooling water flowing out of the valve body 31 according to an overlapping area between the seal opening 582 and the first valve body opening 331 to the third valve body opening 351. That is, the amount of the cooling water flowing out of the first valve body opening 331, the second valve body opening 341, and the third valve body opening 351 are respectively controlled by a rotational angle of the valve body 31.

Next, the driving unit 70 and the driving unit cover 80 will be described. The driving unit cover 80 is used to house the driving unit 70. As shown in FIG. 2, the driving unit 70 and the driving unit cover 80 are disposed in a surface of the partition wall 60 opposite to the surface in contact with the housing opening surface 28. That is, the driving unit 70 and the driving unit cover 80 are disposed in the first end side of the housing 20 in the axial direction D1. The driving unit 70 and the driving unit cover 80 are disposed outside of the housing 20. The driving unit cover 80 is formed into a concave shape. The driving unit cover 80 defines therein a driving unit space 81 that is a space in which the driving unit 70 is housed.

The driving unit 70 is disposed in the driving unit space 81. The driving unit 70 drives the valve body 31. That is, the driving unit 70 drives the shaft 32. The driving unit 70 includes a motor 71 configured to transmit a driving force to rotate the valve body 31 through the shaft 32 and the gear unit 72 configured to transmit the driving force of the motor 71 to the shaft 32. The gear unit 72 includes a shaft insertion portion 73 into which the shaft 32 is inserted. The shaft 32 has a shaft end 40 press-fit into the shaft insertion portion 73.

The valve device 10 includes a rotational angle sensor 74. The rotational angle sensor 74 is configured to detect a rotational angle of the gear unit 72, i.e., a rotational angle of the shaft 32. The rotational angle sensor 74 is housed in the driving unit cover 80. That is, the rotational angle sensor 74 is located in the first end side of the housing 20 in the axial direction D1 and outside of the housing 20 as with the driving unit 70.

Specifically, the rotational angle sensor 74 is attached to the driving unit cover 80 facing the driving unit space 81. The rotational angle sensor 74 is a hall effect sensor incorporating a hall element and configured to detect the rotational angle of the gear unit 72 in a non-contact manner. The rotational angle sensor 74 is connected to an ECU (not shown) and configured to transmit the detected rotational angle of the gear unit 72 to the ECU. The ECU is configured to calculate the rotational angle of the shaft 32 based on the rotational angle of the gear unit 72 transmitted from the rotational angel sensor 74.

As shown in FIGS. 2, 3, and 4, the driving unit cover 80 includes a cover body 82 and a connector 83 protruding from the cover body 82. As shown in FIG. 2, the cover body 82 of the driving unit cover 80 defines therein the driving unit space 81. The connector 83 is an external connector that electrically connects the driving unit 70 and the rotational angle sensor 74 to an external device. The connector 83 has a tubular shape extending in the axial perpendicular direction D2. The connector 83 defines a connecting space 84 therein. The connector 83 defines an opening in the first end side in the axial perpendicular direction D2. The second end side in the axial perpendicular direction D2 is closed. Each of multiple external connecting elements 85 has one end protruding into the connecting space 84. The multiple external connecting elements 85 include a motor connecting element to be electrically connected to the motor 71 and a sensor connecting element to be electrically connected to the rotational angle sensor 74. In FIG. 2, the sensor connecting element of the multiple external connecting elements 85 is described.

Next, an operation of the valve device 10 will be described. The ECU (not shown) calculates an amount of the cooling water required for the air-conditioning heat exchanger 3, the oil cooler 4, and the radiator 5 based on an operating state of the vehicle. The ECU calculates the rotational angle of the valve body 31 to flow the required amount of the cooling water (i.e., calculates the rotational angle of the motor 71). The ECU transmits information on the rotational angle of the motor 71 calculated by the ECU.

The valve device 10 rotates the motor 71 based on the information on the rotational angle received from the ECU. The valve device 10 rotates the motor 71 to rotate the valve body 31 through the gear unit 72 and the shaft 32. Thus, the required amount of the cooling water flows out through the first valve body opening 331, the second valve body opening 341, and the third valve body opening 351. Specifically, the valve device 10 flows the required amounts of the cooling waters for the radiator 5 through the first valve body opening 331, for the air-conditioning heat exchanger 3 through the second valve body opening 341, and for the oil cooler 4 through the third valve body opening 351.

The rotational angle sensor 74 detects the rotational angle of the third gear 723 and transmits information on the detected rotational angle to the ECU. The ECU calculates the rotational angle of the shaft 32 based on the information on the rotational angle of the gear unit 72 transmitted from the valve device 10. After that, the ECU determines whether the appropriate amount of the cooling water is supplied respectively to the air-conditioning heat exchanger 3, the oil cooler 4, and the radiator 5. When the amount of the cooling water flowing respectively to the air-conditioning heat exchanger 3, the oil cooler 4, and the radiator 5 is excessive or insufficient, the ECU calculates the rotational angle of the motor 71 in which the appropriate amount of the cooling water flows and transmits the calculated rotational angle to the valve device 10.

The valve device 10 receives the information on the rotational angle of the motor 71 from the ECU and adjusts the rotational angle of the motor 71 based on the received information of the rotational angle.

Figure 7:
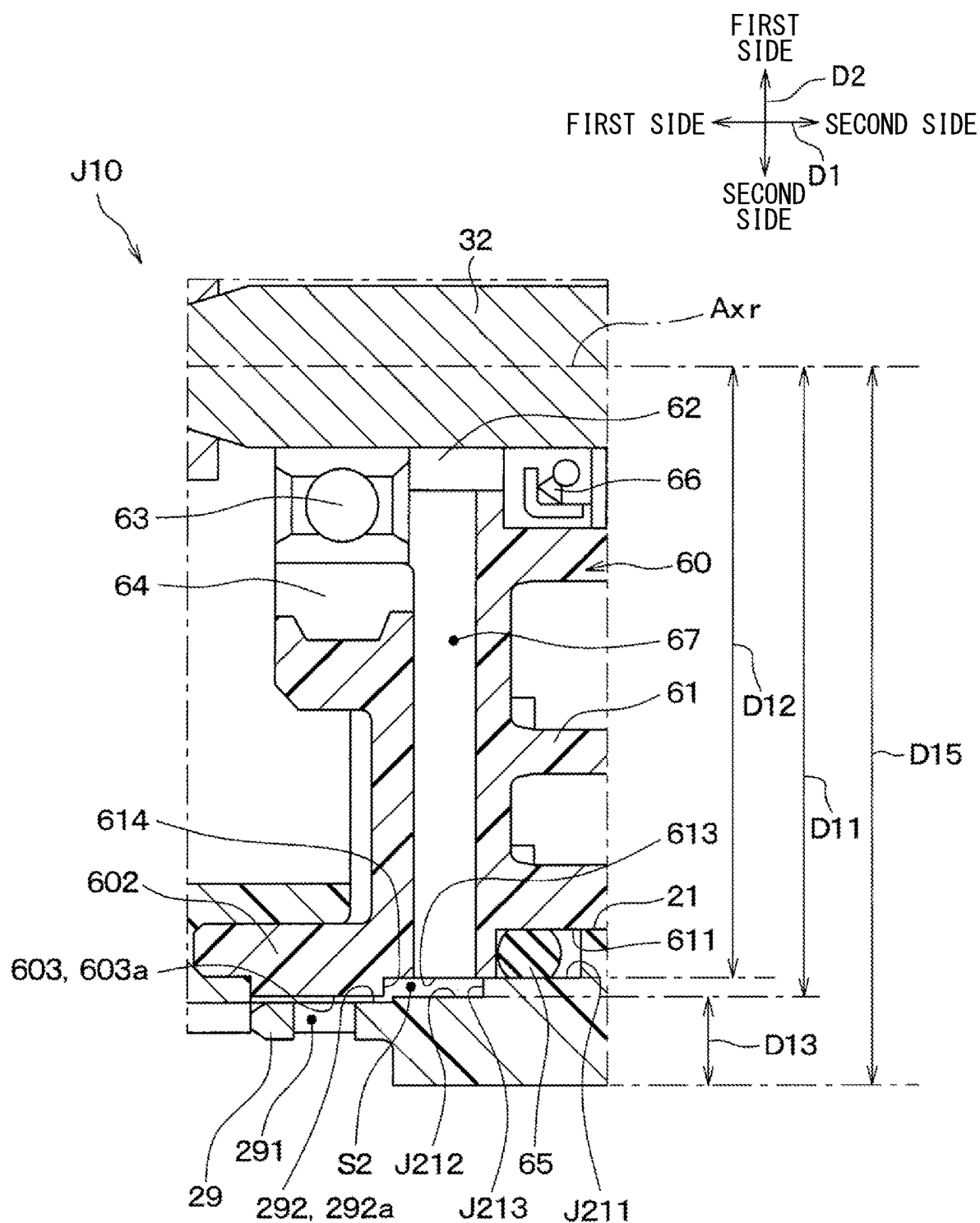
FIG. 7 is a cross sectional view of a valve device in a comparative example corresponding to FIG. 6.

Next, advantages of the valve device 10 in this embodiment will be described compared to a valve device J10 in a comparative example 1 in FIG. 7.

In the valve device J10 in the comparative example, a portion of the housing inner wall 21 overlapping with the opening-closing portion 61 in the axial perpendicular direction D2 includes a first cylindrical inner wall J211, a second cylindrical inner wall J212, and a third cylindrical inner wall J213. The first cylindrical inner wall J211, the second cylindrical inner wall J212, and the third cylindrical inner wall J213 have tubular shapes. The first cylindrical inner wall J211 corresponds to the first cylindrical inner wall 211 in this embodiment. The second cylindrical inner wall J212 is located in the first end side of the first cylindrical inner wall J211 in the axial direction D1. The second cylindrical inner wall J212 is different from the second cylindrical inner wall 212 in this embodiment at a point that the second cylindrical inner wall J212 has a constant distance from the axis Axr in the axial perpendicular direction D2 in a cross section including the axis Axr. The distance between the second cylindrical inner wall J212 and the axis Axr is larger than a distance between the first cylindrical inner wall J211 and the axis Axr. The third cylindrical inner wall J213 is connected to both the first cylindrical inner wall J211 and the second cylindrical inner wall J212. The third cylindrical inner wall J213 extends radially outward of the shaft 32 from the first send side in the axial direction D1 of the first cylindrical inner wall J211 to the second end side in the axial direction D1 of the second cylindrical inner wall J212. The third cylindrical inner wall J213 is a surface perpendicular to the axial direction D1.

The valve device J10 in the comparative example 1 defines an annular space S2 between the second cylindrical inner wall J212 and the third outer wall 613 of the opening-closing portion 61. The annular space S2 has an annular shape. The annular space S2 corresponds to the annular space S1 in this embodiment. The fourth outer wall 614 extends from the third outer wall 613 in the axial perpendicular direction D2. The other configurations of the valve device J10 of the comparative example 1 are the same as those of the valve device 10 of the present embodiment.

In the valve device J10 of the comparative example 1, the distance in the axial perpendicular direction D2 between the second cylindrical inner wall J212 and the axis Axr is constant. Thus, there is a step between the first cylindrical inner wall J211 and the second cylindrical inner wall J212. That is, the third cylindrical inner wall J213 serves as a step surface. Thus, when the opening-closing portion 61 with the housing seal member 65 is inserted into the housing opening portion 281 in assembling the partition wall 60 and the housing 20, the housing seal member 65 may be caught in the step. The valve device J10 of the comparative example 1 has a poor assembling property between the partition wall 60 and the housing 20.

In contrast, the valve device 10 in this embodiment, the second cylindrical inner wall 212 tapers such that the distance in the axial perpendicular direction D2 between the second cylindrical inner wall 212 and the axis Axr gradually decreases in a direction from the first end side of the second cylindrical inner wall 212 to the first cylindrical inner wall 211 in the axial direction D1. The second cylindrical inner wall 212 is continuously connected to the first end side of the first cylindrical inner wall 211 without defining the step between the second cylindrical inner wall 212 and the first cylindrical inner wall 211.

Thus, when the opening-closing portion 61 with the housing seal member 65 is inserted into the housing opening portion 281 from the first end side of the housing 20 in the axial direction D1, the housing seal member 65 is not caught in the step. Therefore, the valve device 10 of this embodiment has a good assembling property between the housing 20 and the partition wall 60.

In the valve device J10 of the comparative example 1, a distance D11 between the second cylindrical inner wall J212 and the axis Axr is larger than a distance D12 between the first cylindrical inner wall J211 and the axis Axr to define the annular space S2. That is, a portion of the housing inner wall 21 located in the same position with the partition wall through hole 67 in the axial direction D1 is distanced from the third outer wall 613 of the opening-closing portion 61.

In contrast, in the valve device 10 of this embodiment, the partition wall through hole 67 is located to overlap, in the axial perpendicular direction D2, with both the first cylindrical inner wall 211 and the second cylindrical inner wall 212 that tapers. The annular space S1 is defined between the partition wall 60 and the second cylindrical inner wall 212 that tapers.

Accordingly, it is not necessary to place the portion of the housing inner wall 21 that is located in the same position in the axial direction D1 with the partition wall through hole 67 to define a distance from the third outer wall 613 of the opening-closing portion 61 for defining the annular space S1. That is, the portion of the housing inner wall 21 located in the same position with the partition wall through hole 67 in the axial direction D1 can be located close to the third outer wall 613 of the opening-closing portion 61 compared to the valve device J10 of the comparative example 1. The distance D12 between the first cylindrical inner wall J211 and the axis Axr in the valve device J10 is the same as the distance D12 between the first cylindrical inner wall 211 and the axis Axr in this embodiment. In addition, the housing 20 has the same thickness D13 at a portion located in the same position with the partition wall through hole 67 in the axial direction D1 between the comparative example 1 and this embodiment. In this case, the valve device 10 in this embodiment can reduce an external dimension D14 that is a distance between the axis Axr at a position same as the partition wall through hole 67 and the housing outer wall 22 to be less than an external dimension D15 of the valve device J10 in the comparative example.

The valve device 10 in this embodiment can improve the assembling property between the housing 20 and the partition wall 60 and downsize the valve device 10 compared to the valve device J10 in the comparative example.

Other Embodiments (1) In the above described embodiment, the fourth outer wall 614 may extend from the third outer wall 613 in the axial perpendicular direction D2. Also in this case, the annular space S1 can be defined between the fourth outer wall 614 and the second cylindrical inner wall 212.

(2) In the above described embodiment, the housing through hole 291 extends in the axial perpendicular direction D2. The partition wall through hole 67 opens on the outer wall 610 of the opening-closing portion 61. The housing through hole 291 is located on a same side of the housing 20 as a side of the opening-closing portion 61 on which the partition wall through hole 67 opens. That is, the partition wall through hole 67 and the housing through hole 291 open in a common direction. However, the housing through hole 291 may be located in a different side of the housing 20 from a side of the opening-closing portion 61 on which the partition wall through hole 67 opens. That is, the partition wall through hole 67 and the housing through hole 291 may open in different directions. It is required that the housing through hole 291 is fluidly in communication with the annular space S1. However, in view of discharging the cooling water flowing into the shaft insertion hole 62 smoothly, it is preferable that the housing through hole 291 is located in the same side of the housing 20 as a side of the opening-closing portion 61 on which the partition wall through hole 67 opens.

(3) In the above described embodiment, the portion 292a of the inner wall 292 of the housing outer circumferential portion 29 that is located in a side of the housing 20 facing the engine attachment surface 25 corresponds to the third inner wall. However, the third inner wall may be formed with a tubular portion of the housing inner wall 21 in which the opening-closing portion 61 is disposed. That is, the third inner wall may have a tubular shape in which the engaging portion is disposed.

(4) In the above described embodiment, the valve device 10 adjusts the amount of the cooling water for the internal combustion engine 2. However, the valve device 10 may adjust an amount of a liquid other than the cooling water. In this case, the valve device 10 is not necessarily disposed in the vehicle.

(5) The present disclosure is not limited to the foregoing description of the embodiments and can be modified within the scope of the present disclosure. The present disclosure may also be varied in many ways. Such variations are not to be regarded as departure from the disclosure, and all such modifications are intended to be included within the scope of the disclosure. The above embodiments are not independent of each other, and can be appropriately combined together except when the combination is obviously impossible. Further, in each of the above-mentioned embodiments, it goes without saying that components of the embodiment are not necessarily essential except for a case in which the components are particularly clearly specified as essential components, a case in which the components are clearly considered in principle as essential components, and the like. A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Further, in each of the embodiments described above, when materials, shapes, positional relationships, and the like, of the components and the like, are mentioned, they are not limited to these materials, shapes, positional relationships, and the like, unless otherwise specified and unless limited to specific materials, shapes, positional relationships, and the like.

What is claimed is:

1. A valve device configured to adjust a flow rate of a fluid, the valve device comprising:
    a housing that defines an inner space therein, an inflow opening, and an outflow opening, the fluid flowing into the inner space through the inflow opening and flowing out of the inner space through the outflow opening;
    a valve that is disposed in the inner space and includes:
        a valve body configured to adjust the flow rate of the fluid flowing out of the inner space through the outflow opening; and
        a rotational shaft configured to rotate the valve body, a first end side and a second end side for the valve device being defined in an axial direction of the rotational shaft;
    a partition wall that is formed as a separate component from the housing and fit into the housing on the first end side of the housing to separate the inner space from an outer space of the housing, the partition wall rotatably supporting the rotational shaft; and
    a seal member configured to seal a space between the partition wall and the housing, wherein
    the housing includes a first cylindrical inner wall, a second cylindrical inner wall, and a third inner wall, the first cylindrical inner wall, the second cylindrical inner wall, and the third inner wall being arranged and connected to each other in this order from the second end side to the first end side of the housing;
    the first cylindrical inner wall is in contact with the seal member when the partition wall is attached to the housing,
    the second cylindrical inner wall is tapered relative to an axis of the rotational shaft such that a distance between the second cylindrical inner wall and the axis in a radial direction of the rotational shaft gradually decreases from the first end side to the second end side of the second cylindrical inner wall,
    the third inner wall defines a housing through hole passing through the housing,
    the partition wall is located radially inward of both the first cylindrical inner wall and the second cylindrical inner wall,
    the seal member is attached to the partition wall to entirely surround an outer wall of the partition wall in a circumferential direction of the partition wall, the seal member being pressed between the outer wall of the partition wall and the first cylindrical inner wall,
    the partition wall defines an insertion hole into which the rotational shaft is inserted and a partition wall through hole that passes through the partition wall and that extends from the insertion hole in the radial direction,
    the partition wall through hole is located on the first end side of the sealing member in the axial direction and overlaps with both the first cylindrical inner wall and the second cylindrical inner wall in the radial direction, and
    an annular space that is in communication with both the partition wall through hole and the housing through hole is defined between the second cylindrical inner wall and the outer wall of the partition wall.

2. The valve device according to claim 1, wherein
the partition wall through hole opens on the outer wall,
the housing through hole is located on a same side of the housing as a side of the partition wall on which the partition wall through hole opens, and
the partition wall through hole and the housing through hole open in a common direction.

* * * * *